United States Patent [19]

Pollock

[11] Patent Number: 6,158,566

[45] Date of Patent: Dec. 12, 2000

[54] TRANSFER SYSTEM FOR A CONVEYOR

[75] Inventor: Daniel A. Pollock, Perrysburg, Ohio

[73] Assignee: Dillin Engineered Systems Corporation, Perrysburg, Ohio

[21] Appl. No.: 08/969,052

[22] Filed: Nov. 12, 1997

[51] Int. Cl.[7] .................................................. B65G 1/127
[52] U.S. Cl. ..................................... 198/347.3; 198/468.6
[58] Field of Search .............................. 198/347.3, 468.6, 198/347.2–3

[56] References Cited

U.S. PATENT DOCUMENTS

| | | | |
|---|---|---|---|
| 1,695,115 | 12/1928 | Lockhart | 198/468.6 |
| 3,991,685 | 11/1976 | Toby . | |
| 4,010,843 | 3/1977 | Lucas . | |
| 4,042,118 | 8/1977 | Schmidt . | |
| 4,048,784 | 9/1977 | Toby . | |
| 4,273,234 | 6/1981 | Bourgeois | 198/347.3 |
| 4,273,243 | 6/1981 | Locher . | |
| 4,499,987 | 2/1985 | Long . | |
| 4,505,375 | 3/1985 | Kuster . | |
| 4,609,091 | 9/1986 | Dorner | 198/347.3 |
| 4,715,766 | 12/1987 | Gebhardt . | |
| 4,865,180 | 9/1989 | Brems et al. . | |
| 4,953,687 | 9/1990 | Gazzarrini . | |
| 5,012,918 | 5/1991 | Acker et al. . | |
| 5,074,096 | 12/1991 | Focke | 198/347.3 |
| 5,092,452 | 3/1992 | Nakayama . | |
| 5,238,100 | 8/1993 | Rose, Jr. et al. . | |
| 5,255,773 | 10/1993 | Pollock . | |
| 5,366,063 | 11/1994 | Pollock . | |

*Primary Examiner*—Jospeh E. Valenza
*Assistant Examiner*—Mark A. Deuble

*Attorney, Agent, or Firm*—MacMillan, Sobanski & Todd, LLC

[57] ABSTRACT

A transfer system that moves packages on a conveyor to an accumulator and back thereto includes a plurality of spaced-apart rollers which rotate to transport the packages. The accumulator includes a plurality of storage shelves, each of which is formed from a plurality of spaced apart fingers. The transfer system includes a support structure, an actuator for moving the support structure a predetermined vertical distance and a predetermined horizontal distance, and a plurality of transfer fins secured to the support structure. Each transfer fin has a relatively small thickness and is adapted to fit within a space between a pair of adjacent rollers used in the conveyor and a space between a pair of accumulator shelf finger. The space between the rollers and the space between the accumulator fingers are generally aligned such that the fins can be moved vertically to supportably lift the package off of the conveyor rollers and moved horizontally to deposit the package on the accumulator shelves. In a first mode of operation, the transfer fins have a length which is approximately equal to the total length of the number of rows of packages which can be stored on the accumulator shelf. In this embodiment, the transfer fins move a predetermined horizontal distance which is approximately equal to the length of one package. Each successive horizontal movement of the fins moves the packages sideways a distance equal to one-package, thereby filling the accumulator shelf by a series of stepped movement of the packages. In a second mode of operation, the transfer fins have a length which is approximately equal to the length of one package to be stored on the accumulator shelf. In this embodiment, the transfer fins move a variable horizontal distance depending on the row or position where the package is to be stored.

9 Claims, 8 Drawing Sheets

TRANSFER SYSTEM FOR A CONVEYOR

BACKGROUND OF THE INVENTION

This invention relates in general to conveyor systems and in particular to an improved transfer system for use in transferring packages between a conveyor system and an accumulator.

Conveyors are well known devices which are commonly used in production line situations to transport packages from one location to another. For example, a conveyor may be used to transport packages of a product from an upstream filling station, wherein the packages are filled with the product and sealed, to a downstream packaging station, wherein the sealed packages are packaged into larger shipping packages. Many conveyor system structures are known in the art for accomplishing this basic function.

Usually, the conveyor system is designed to provide a continuous flow of packages from the upstream station on the production line to the downstream station. However, it occasionally becomes necessary to halt this continuous flow of packages. For example, the flow of packages may need to be stopped because one or more of the packages becomes jammed in the production line and must be cleared. Alternatively, the flow of packages may need to be halted because the downstream processing equipment is temporarily unable to accept the continued flow of packages. To accommodate this, some known conveyor systems are provided with a control system which simply ceases the flow of packages through the entire conveyor system when this occurs. This is usually undesirable because it requires that the upstream equipment on the production line cease operation until the problem in the conveyor system or in the downstream processing equipment is corrected.

To address this problem, it is known to provide one or more accumulators midstream within a conveyor system. An accumulator is a device which is typically located between first and second individual conveyors in a conveyor system. When the production line is operating normally, the accumulator receives products from the first conveyor and merely transports them therethrough to the second conveyor. However, when a problem occurs in the downstream portion of the production line, such as described above, the accumulator receives products from the first conveyor and temporarily stores them therein until the problem is corrected. Thus, the accumulator functions to temporarily prevent the flow of the packages downstream thereof, while permitting the upstream portion of the production line to continue, at least temporarily, in normal operations.

Many different accumulator structures are known in the art. One type of accumulator structure is known as a horizontal accumulator. A typically horizontal accumulator includes a plurality of horizontally spaced, parallel storage paths. One or more entrance gates are provided for directing the flow of products from the first conveyor to one of the storage paths as necessary. In this manner, the flow of products downstream is temporarily prevented. When it is desired to resume the flow of products downstream of the horizontal accumulator, one or more exit gates are opened so as to direct the stored products from the storage paths into the second conveyor. While horizontal accumulators of this general type are effective for temporarily preventing the flow of products therethrough, they have been found to be inefficient because of their physical size. Specifically, the parallel storage paths of these horizontal accumulators occupy an undesirable large amount of floor space in the facility in which they are used.

To minimize this floor space problem, a second type of accumulator structure, known as a vertical accumulator, has been developed. A typical vertical accumulator includes a plurality of vertically spaced, parallel storage paths. Packages passing through the vertical accumulator are received from the first conveyor and stored in groups on shelves. When a first shelf is filled with a plurality of packages, it is elevated above the vertical height of the first and second conveyors to permit a second shelf to be filled in a similar manner. When it is desired to return the stored products to the conveyor system, the shelves are sequentially lowered to permit the packages to be fed to the second conveyor. Thus, it can be seen that vertical accumulators occupy a relatively small amount of floor space in the facility in which they are used and, therefore, are generally preferable to the horizontal accumulators described above.

To facilitate the use of accumulators, a transfer system is provided to transfer the packages from the conveyor to the accumulator and from the accumulator back to the conveyor. In some accumulators, the upper surface of the accumulator shelf to be loaded (or unloaded) is positioned directly adjacent the upper surface of the conveyor, and a mechanical pusher or other device is provided to push the packages from the conveyor to the accumulator shelf (or from the accumulator shelf to the conveyor). Although effective for relatively large packages, such a pusher transfer system requires equipment both on the conveyor and in the accumulator to effect movement in both directions. Furthermore, pusher transfer systems cannot handle relatively small or delicate packages and are relatively slow to cycle during operation because the shelf cannot be moved until the mechanical pusher has been fully retracted after moving the packages onto (or off of) the accumulator shelf.

In other accumulators, each accumulator shelf is formed from a plurality of elongated fingers that are sequentially interleaved with the rollers of the conveyor. To transfer packages from the conveyor to the accumulator, one shelf of fingers is raised to lift the packages off the rollers of the conveyor for storage, while the fingers of the next empty shelf are positioned between the rollers of the conveyor. This interleaved finger transfer system is effective for handling relatively small and delicate packages. However, because the fingers of the accumulator shelves are interleaved between the rollers of the conveyor and are sized to handle relatively large loads, the rollers of the conveyor must be spaced apart from one another by a relatively large distance. This relatively large roller spacing prevents this type of system from handling packages that are extremely small or extremely delicate. The distance between adjacent centers of the roller of the conveyor is one factor which determines the size of packages which can be conveyed thereon. Typically, the minimum size of a package that can be moved on a conveyor is about two to three times the distance between adjacent centers of the rollers. Thus, it would be desirable to provide an improved structure for a transfer system that is capable of quickly moving extremely small packages onto and off of an accumulator shelf.

SUMMARY OF THE INVENTION

This invention relates to an improved structure for a transfer system for use in moving packages from a conveyor to an accumulator and back thereto which includes a group of relatively thin, transfer fins that fit in a small center-to-center distance between the rollers of a conveyor. Thus, the transfer systems of this invention can be used on conveyor systems adapted to transport relatively small packages. The rollers of the conveyor are spaced apart and generally aligned with a plurality of elongate, spaced apart fingers which form the shelves of the accumulator. Each transfer fin is adapted to fit within the spaces separating the aligned conveyor rollers and accumulator fingers. Normally, the top surface of the transfer fins are positioned below the top surface of the conveyor rollers. The transfer fins can be moved a predetermined amount of vertical and horizontal motion to lift the packages from the conveyor, support the packages thereon, move the packages to a position on an accumulator shelf, and deposit the packages on the accumulator shelf in a relatively short cycle time. In a first embodiment of this invention, the transfer fins have a length which is approximately equal to the total length of the number of rows of packages which can be stored on the accumulator shelf. In this embodiment, the transfer fins move a predetermined horizontal distance which is approximately equal to the length of one package. Each successive horizontal movement of the fins moves the packages sideways a distance equal to one-package, thereby filling the accumulator shelf by a series of stepped movement of the packages. In a second embodiment of this invention, the transfer fins have a length which is approximately equal to the length of one package to be stored on the accumulator shelf. In this embodiment, the transfer fins move a different horizontal distance depending on the row or position where the package is to be stored. Preferably, the transfer fins are generally elongate, wedge-shaped members. Each fin has a relatively thin thickness which allows it to be disposed vertically in a relatively small, center-to-center distance between a pair of conveyor rollers and pair of accumulator fingers. Preferably, the transfer fins have a thickness in the range of about 1/16 to about 1/4 inches. It is also preferred that the transfer fins are made from a lightweight, durable material having some flexibility. A preferred material for use in the transfer fins is an engineering plastic such as polycarbonate. Each transfer fin is secured to a support system by a bracket having several openings formed therein. These openings allow a tab formed on an end of each fin to be lockably secured within the bracket. The support structure is operatively connected to a suitable actuator to achieve the desired horizontal and vertical travel of the transfer fins.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
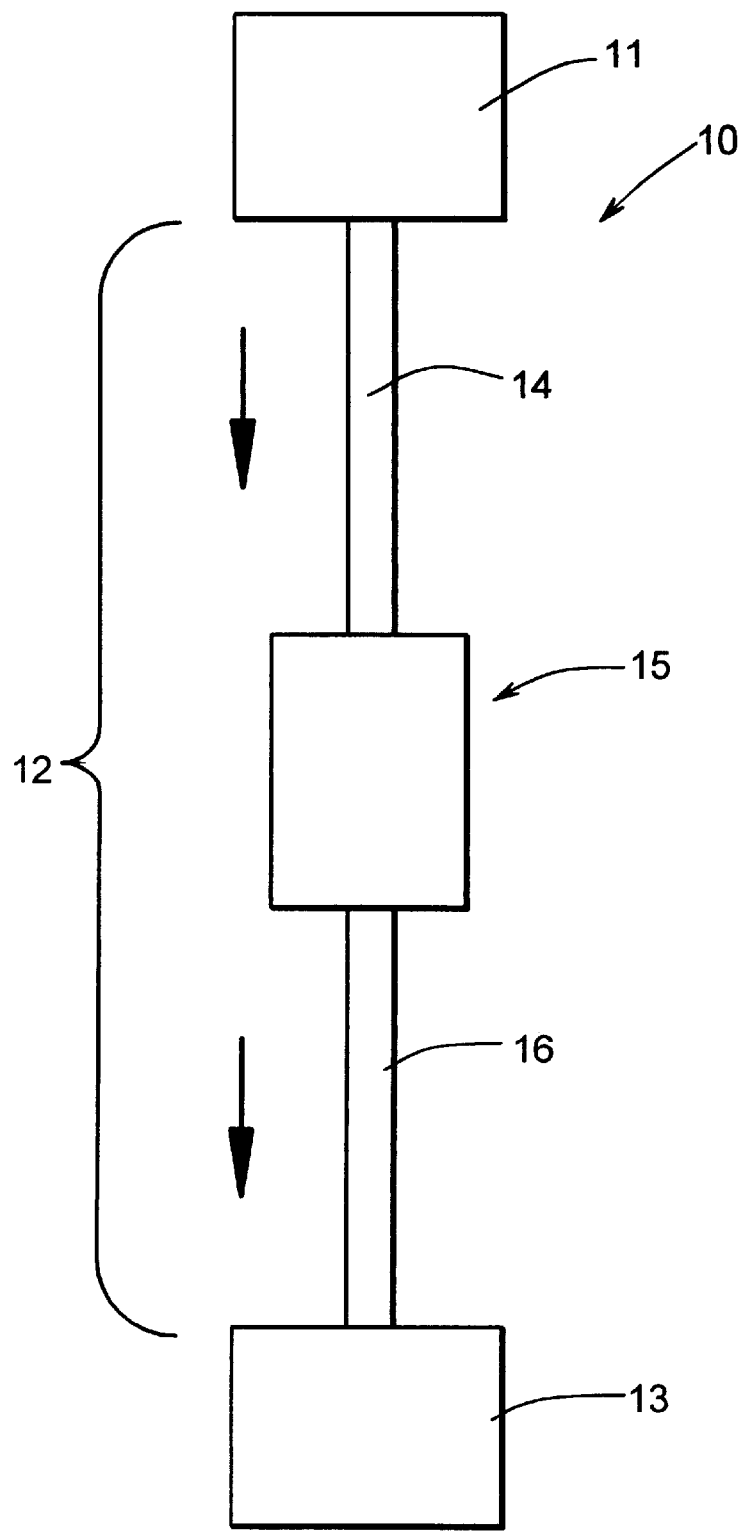
FIG. 1 is a simplified schematic top plan view of a conventional package handling system for use in transferring packages.

Referring now to the drawings, there is illustrated in FIG. 1 a simplified schematic top plan view of an package handling system, indicated generally at 10, in accordance with this invention. The package handling system 10 includes an upstream processing station 11, a conveyor system 12, and a downstream processing station 13. The upstream processing station 11, may for example, be a conventional filling station 11 which is adapted to receive packages, such as empty packages (not shown in FIG. 1), and fill them with a product. The filled packages are fed from the filling station 11 through the conveyor system 12 to the downstream processing station 13. The downstream processing station may, for example, be a conventional packaging station 13, wherein the sealed packages from the conveyor system 12 are packaged into larger shipping packages. The conveyor system 12 can include an upstream conveyor portion 14 that receives the filled packages from the filling station 11. The upstream conveyor portion 14 transports the packages in a direction indicated by the upper arrow in FIG. 1 to an accumulator 15. The filled packages can then pass from the accumulator 15 to a downstream conveyor portion conveyor 16 of the conveyor system 12. The downstream conveyor portion 16 receives the packages from the accumulator 15 and transports them in a direction indicated by the lower arrow in FIG. 1 to the packaging station 13.

Figure 2:
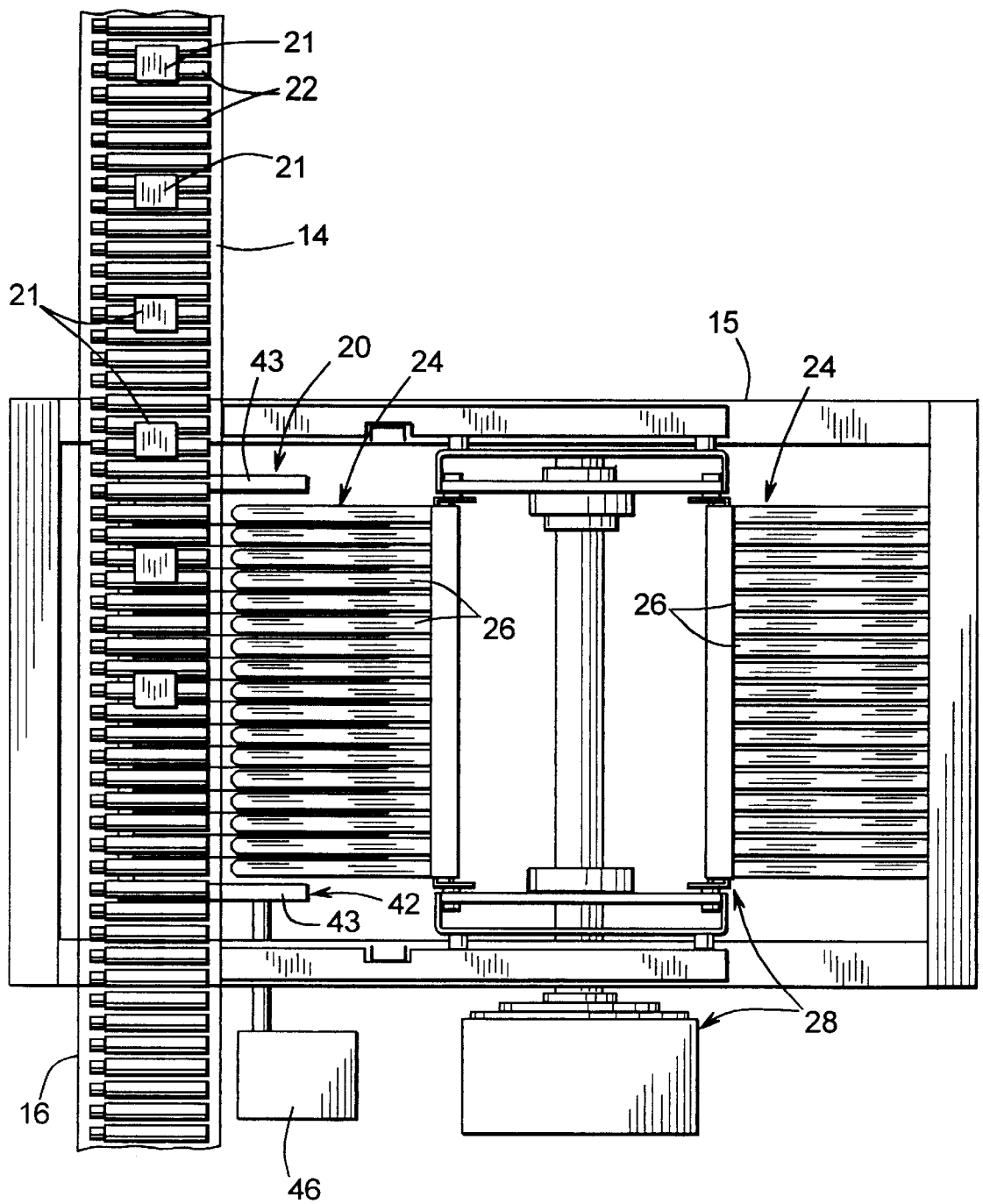
FIG. 2 is an enlarged top plan view of an improved transfer system in accordance with this invention for use with the package handling system illustrated in FIG. 1.
Figure 3:
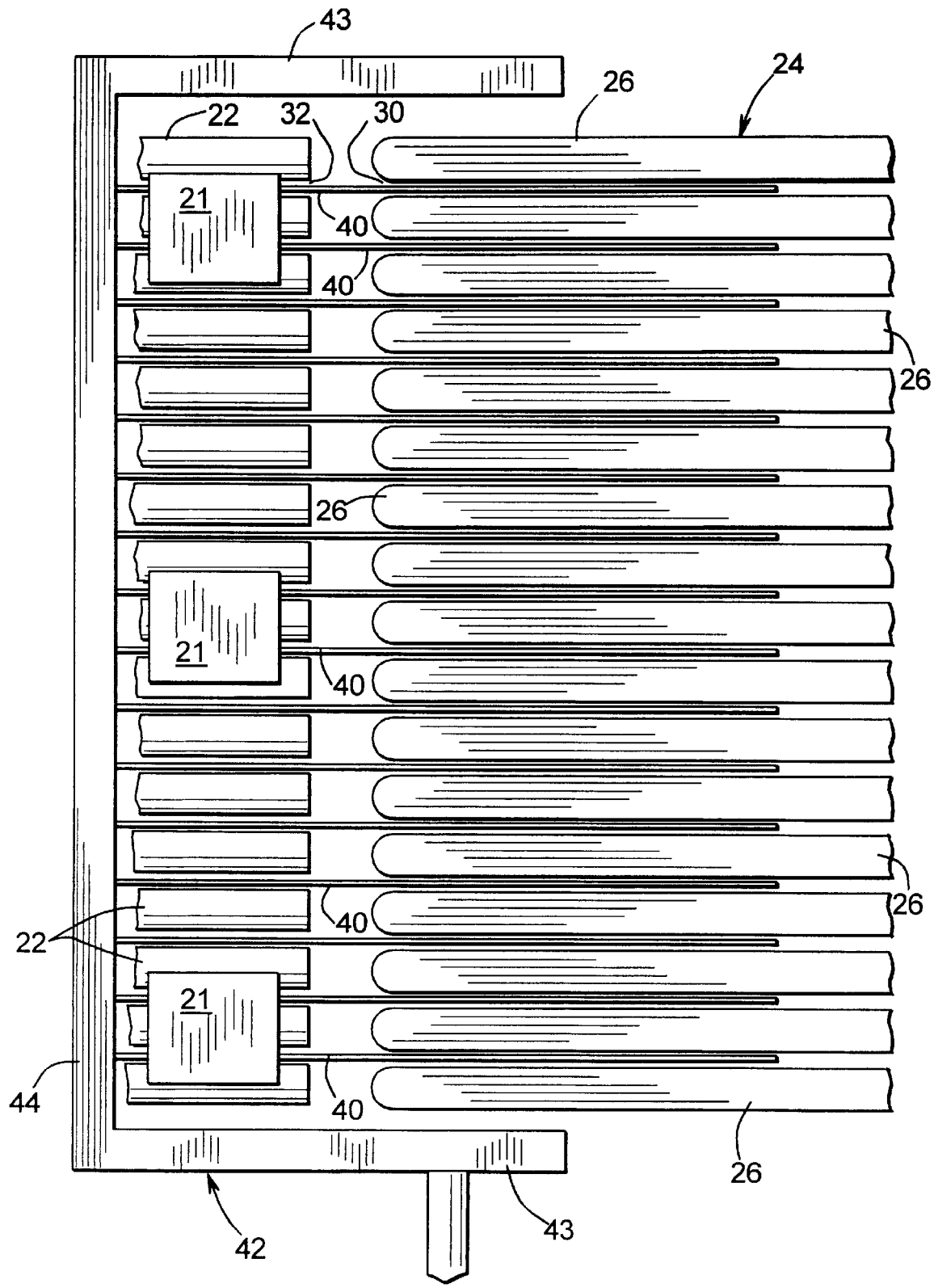
FIG. 3 is a further enlarged top plan view of a portion of the transfer system illustrated in FIG. 2.

Referring now to FIGS. 2 and 3, the structures of the conveyor 12 and the accumulator 15 are illustrated in more detail. Also illustrated is a transfer system, indicated generally at 20, for transferring one or more packages 21 from the conveyor system 12 to the accumulator 15. As used herein, the term "package" includes any product capable of being transported on a conveyor system including, but not limited to, boxes, containers, bottles, and outer-wrapped products, such as individually-wrapped cheese slices. The term "package" also includes a plurality of such individual products that are simultaneously moved, as described in detail below. The conveyor system 12 includes a plurality of spaced-apart rollers 22 which are usually, but not necessarily, rotatably driven so as to move the packages 21 from the upstream station 11 to the downstream station 13.

The accumulator 15 includes a plurality of storage shelves, two of which are illustrated generally at 24 in FIG. 2. Each accumulator shelf 24 is formed by a plurality of spaced-apart fingers 26, which collectively define a surface upon which the packages 21 are to be temporarily stored when the accumulator 15 is operated. The accumulator shelves 24 are connected to a lifting mechanism, indicated generally at 28. The lifting mechanism 28 is provided to initially position an empty one of the shelves 24 directly adjacent the conveyor system 12. When that shelf 24 is filled with packages 21 in the manner discussed below, the lifting mechanism 28 is operated to move the filled shelf 24 vertically relative to the conveyor system 12 and position another empty shelf 24 directly adjacent thereto. This type of accumulator 15 is often referred to as a vertical accumulator. An example of a vertical accumulator 15 that can be adapted for use with the transfer system of this invention is described and illustrated in detail in U.S. Pat. No. 5,366,063, owned by the assignee of this invention. The disclosure of that patent is incorporated herein by reference. However, other types of accumulators may be used with this invention.

As best shown in FIG. 3, each of the fingers 26 of the accumulator shelf 24 is co-axially aligned with a corresponding one of the rollers 22 of the conveyor system 12. As such, relatively narrow axial spaces 30 defined between adjacent ones of the fingers 26 are co-axially aligned with relatively narrow axial spaces 32 defined between adjacent ones of the rollers 22. The transfer system 20 of this invention includes a plurality of relatively narrow fins 40 which are aligned with the aligned spaces 30 and 32. Each of the fins 40 is preferably embodied as a relatively thin plate that can fit with clearance between adjacent ones of the fingers 26 and adjacent ones of the rollers 22. A preferred material for use in making the fins 40 is any of the engineering plastics, including, but not limited to nylon, polyacetal, polycarbonate, and ABS resins. More preferably, the fins 40 are made from a LEXAN® or PLEXIGLAS® type material. As an example, for rollers having a center-to-center distance of about one inch, the fins 40 can be formed having a thickness in the range from about one-sixteenth inch to about one-quarter inch when made from a LEXAN® type material.

In a typical conveyor system 12, the distance between the centers of adjacent ones of the rollers 22 is about two inches or more. In order to transport small packages, packages, or flexible items, it is usually necessary to reduce this center-to-center roller distance. For some small packages or flexible items, a center-to-center distance of about one inch or less is desirable between adjacent ones of the rollers 22. By forming the fins 40 from relatively thin plates, the sizes of the spaces 32 between adjacent ones of the rollers 22 (and, therefore, the sizes of the spaces 30 between adjacent ones of the fingers 26) can be reduced to about one-half inch or less.

The fins 40 are secured to a support structure, indicated generally at 42, for concurrent movement. As shown in FIGS. 2 and 3, the illustrated support structure 42 is a generally U-shaped member including a pair of side rails 43 having a main rail 44 extending therebetween. In the illustrated support member 42, the side rails 43 extend generally parallel to the fins 40, while the main rail 44 extends generally perpendicularly thereto. The main rail 44 and the side rails 43 may be formed from one or more tubular members, although such is not necessary. The main rail 44 provides a support surface for securing a plurality of fins 40 thereto. As such, the main rail 44 provides rigidity to the elongate, relatively thin fins 40. The side rails 43 are connected to the main rail 44 and extend beyond the conveyor 12. As such, the side rails 43 are more accessible to attach other components to the support structure 42. For example, one or both of the side rails 43 may be used as the structure used to move all of the fins 40 collectively as a group. The support structure 42 may, however, be embodied as any convenient structure. The fins 40 are secured to the support member 42 in any conventional manner such that movement of the support member 42 causes corresponding movement of the fins 40.

The support structure 42 may be configured to support a number of fins 40 which correspond generally to the number of spaces 30 and 32. Alternatively, the support structure 42 may be configured to support a greater number of fins 40 such that the transfer system 20 includes one or two portions which extend upstream and downstream (or both) from the accumulator 15. In a preferred embodiment of the invention, the overall length of the plurality or bank of fins 40 is approximately equal to the usable length of the shelf 24 of the accumulator 15.

An actuator 46 (see FIG. 2) is connected to the support structure 42 for moving the fins 40 as a group in one or more desired (horizontal and vertical, typically) directions. The movement of the fins 40 will be described in detail below. In general, however, the actuator 46 should be capable of providing sufficient vertical motion of the fins 40 such that the fins 40 can be positioned both above and below the upper conveying surface defined by the rollers 22 of the conveyor system 12. The actuator 46 may be embodied as any suitable structure capable of causing the desired movement of the fins 40 described below, including, but not limited to, fluid actuators (such as hydraulic or pneumatic actuators) and electromechanical actuators (such as linear actuators).

Figure 4A:
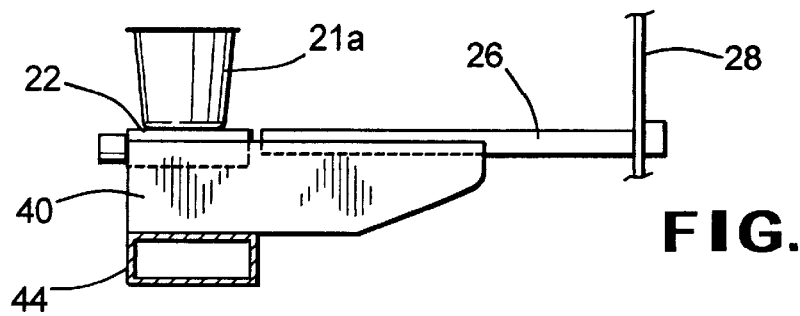
FIGS. 4A through 4J are schematic side elevational views sequentially illustrating the operation of a first embodiment of the transfer system illustrated in FIGS. 2 and 3.
Figure 4B:
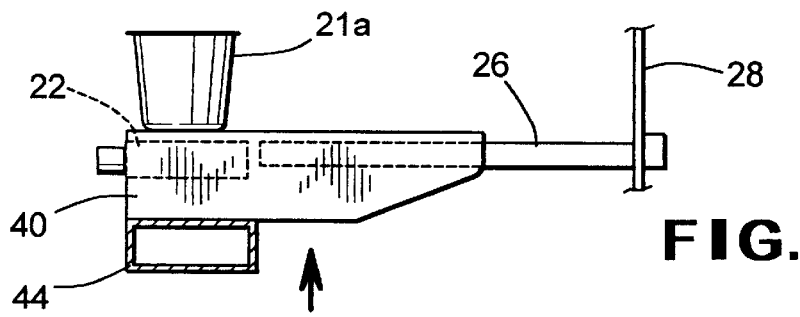
Figure 4C:
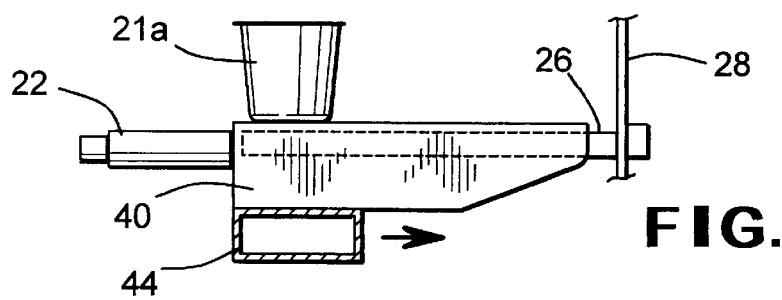
Figure 4D:
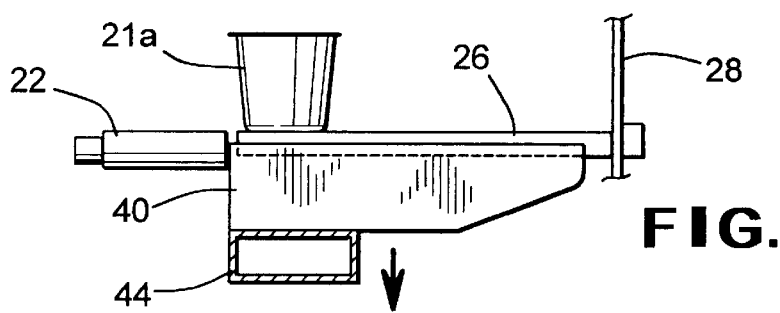
Figure 4E:
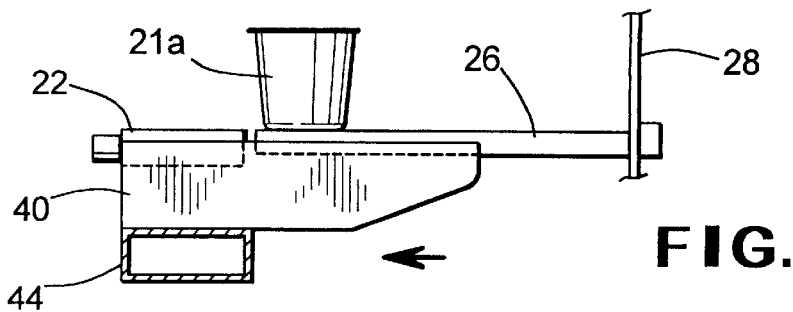

The operation of a first embodiment of the transfer system 20 is shown in FIGS. 4A through 4J. As shown in FIG. 4A, the illustrated fin 40 (which preferably is representative of all of the fins 40) is a generally elongated, plate-shaped member having a relatively wide width relative to the rollers 22 of the conveyor system and the fingers 26 of the accumulator shelf 24. As shown in FIG. 4A, the upper surfaces of the fins 40 are initially positioned below the conveying surface of the rollers 22 so that a first plurality of packages, such as illustrated at 21*a*, can be transported by the conveyor 12 into the accumulator 15. During normal operation of the package handling system 10, the fins 40 remain the position illustrated in FIG. 4A and do not engage any of the packages 21*a*. However, when it is desired to load the accumulator 15, the actuator 46 of the transfer system 20 is operated to raise the main rail 44 of the support structure 42, thereby raising the fins 40 (as shown by the arrow in FIG. 4B) such that the upper surfaces thereof are elevated above the conveying surface of the rollers 22. In this manner, the packages 21*a* are elevated by two or more fins 40, depending on the size thereof. Next, the actuator 46 is operated to move the main rail 44 and the fins 40 laterally, as shown by the arrow in FIG. 4C, toward the fingers 26 of the accumulator 15. The actuator 46 is then operated to lower the main rail 44 and the fins 40 in the direction of the arrow in FIG. 4D so as to deposit the first plurality of packages 21*a* on the fingers 26 of the accumulator 15. It can be seen that the lateral movement of the fins 40 is relatively small such that the first plurality of packages 21*a* is located at an outermost position on the accumulator fingers 24. Thereafter, the actuator 46 is operated to return the fins 40 laterally (in the direction of the arrow in FIG. 4E) to the initial position illustrated in FIG. 4A.

Figure 4F:
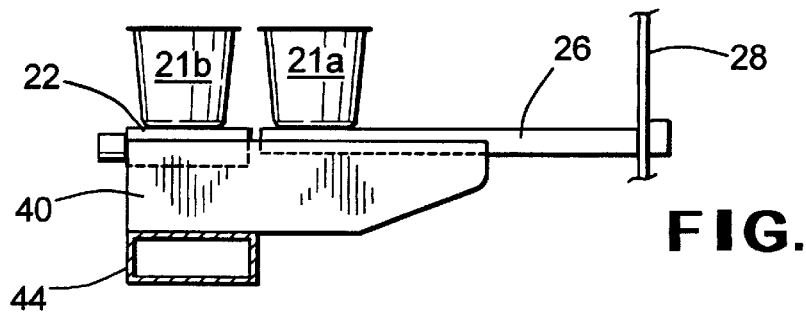
Figure 4G:
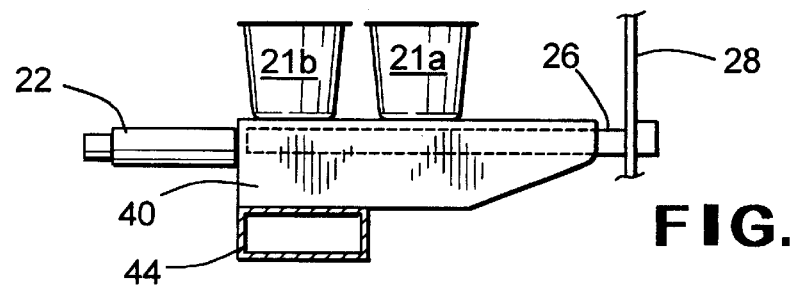

Once the fins 40 have deposited the first plurality of packages 21*a* on the fingers 26, the conveyor system 12 can be operated to transport a second plurality of packages 21*b* into the accumulator 15, as shown in FIG. 4F. The actuator 46 is again operated to elevate the fins 40 to lift the second plurality of packages 21*b* off of the rollers 22, as described above. At the same time, however, the fins 40 also lift the first plurality of packages 21*a* off of the fingers 26. Thus, both the first and second pluralities of packages 21*a* and 21*b* are supported on the fins 40. The actuator 46 is then operated to move the fins 40 laterally as shown in FIG. 4G, then downwardly so as to deposit both the first and second pluralities of packages 21*a* and 21*b* on the fingers 26 of the accumulator 15. Thus, the first plurality of packages 21*a* is deposited at an intermediate position on the fingers 26, while the second plurality of packages 21*b* is deposited at the outermost position on the fingers 26. The fins 40 are then lowered and returned to their initial position, as described above.

Figure 4H:
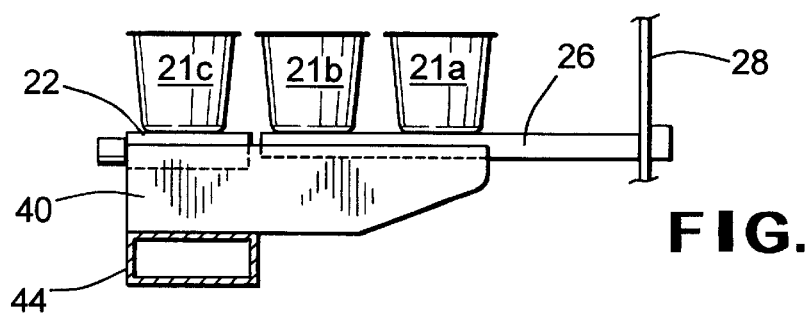
Figure 4I:
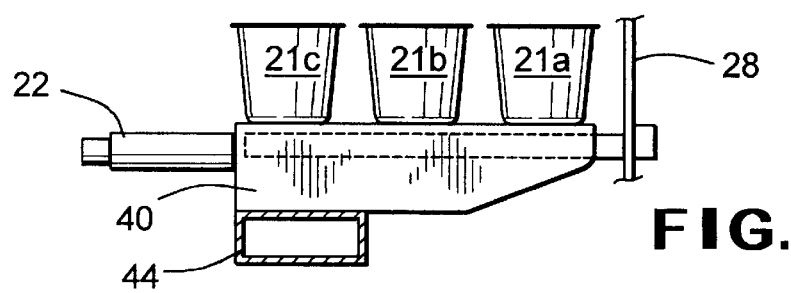
Figure 4J:
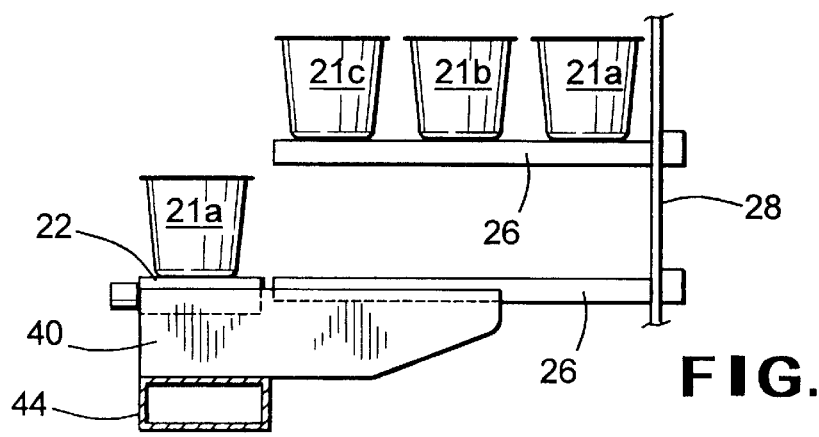

This same procedure can be repeated to deposit a third plurality of packages 21*c* on the fingers 26. Once the fins 40 have deposited the first and second pluralities of packages 21*a* and 21*b* on the fingers 26 as described above, the conveyor system 12 can be operated to transport a third plurality of packages 21*c* into the accumulator 15, as shown in FIG. 4H. The actuator 46 is again operated to elevate the fins 40 to lift the third plurality of packages 21*c* off of the rollers 22, as described above. At the same time, however, the fins 40 also lift the first and second pluralities of packages 21a and 21b off of the fingers 26. Thus, the first, second, and third pluralities of packages 21a, 21b, and 21c are all supported on the fins 40. The actuator 46 is then operated to move the fins 40 laterally as shown in FIG. 4I, then downwardly so as to deposit both the first, second, and third pluralities of packages 21a, 21b, and 21c on the fingers 26 of the accumulator 15. Thus, the first plurality of packages 21a is deposited at an innermost position on the fingers 26, the second plurality of packages 21b is deposited at the intermediate position on the fingers 26, and the third plurality of packages 21c is deposited at the outermost position on the fingers 26. The fins 40 are then lowered and returned to their initial position, as described above. As shown in FIG. 4J, however, once the accumulator fingers 26 have been filled with whatever number of packages 21 it is capable of storing, the accumulator shelf 24 is elevated by the lift mechanism 28 to allow the next empty shelf 24 to be moved up and aligned with the conveyor rollers 22 for storage in the same manner. The reverse process is followed to unload the packages from the accumulator shelves 24 to the conveyor system 12.

In the first embodiment of the invention described above, three storage positions are available one each of the accumulator shelves 24. It can be seen that the number of storage positions available on each of the accumulator shelves 24 will vary with the relative sizes of the packages 21 the lengths of the fins 40, and the lengths of the lift fingers 26. The design requirements of the actuator 46 are relatively simple in the illustrated embodiment in that the amount of lateral movement of the fins 40 is constant for each successive plurality of packages 21a, 21b, 21c. The amount of this lateral movement is a function of several factors, including the size of the packages 21 and the distance between the rollers 22 and the fingers 26 of each shelf 24. However, it is desirable that the actuator 46 be capable of varying the amount of this lateral movement to accommodate different sizes of packages 21 and accumulators 15. Once this amount of lateral movement is determined for the particular sizes of the accumulator 15 and the packages 21, the actuator 46 requires less programming and/or setup time to configure the transfer system 20 for operation. In addition, the transfer system 20 as a whole operates faster because the fins 40 need only move a predetermined amount in the horizontal direction to be clear of the conveyor 12, thus allowing additional packages 21 to move into this section of the conveyor 12.

Figure 5A:
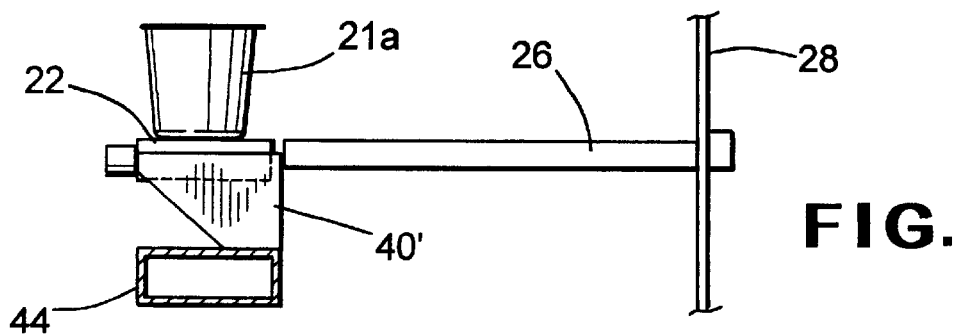
FIGS. 5A through 5G are schematic side elevational views sequentially illustrating the operation of a second embodiment of the transfer system illustrated in FIGS. 2 and 3.
Figure 5B:
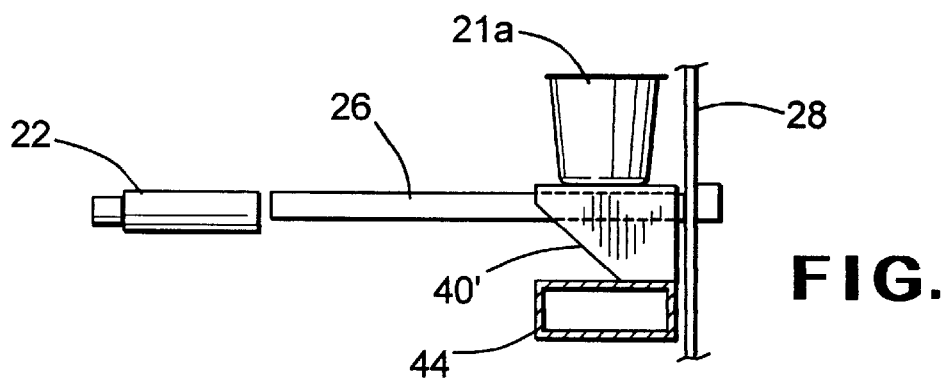

The operation of a second embodiment of the transfer system 20 is shown in FIGS. 5A through 5G. As shown in FIG. 5A, the illustrated fin 40' (which preferably is representative of all of the fins 40') is a generally elongated, plate-shaped member having a relatively narrow width relative to the rollers 22 of the conveyor system and the fingers 26 of the accumulator shelf 24. As shown in FIG. 5A, the upper surfaces of the fins 40' are initially positioned below the conveying surface of the rollers 22 so that a first plurality of packages, such as illustrated at 21a, can be transported by the conveyor 12 into the accumulator 15. During normal operation of the package handling system 10, the fins 40' remain the position illustrated in FIG. 4A and do not engage any of the packages 21a. However, when it is desired to load the accumulator 15, the actuator 46 of the transfer system 20 is operated to raise the main rail 44 of the support structure 42, thereby raising the fins 40' such that the upper surfaces thereof are elevated above the conveying surface of the rollers 22. In this manner, the packages 21a are elevated by two or more fins 40', depending on the size thereof. Next, the actuator 46 is operated to move the main rail 44 and the fins 40' laterally toward the fingers 26 of the accumulator 15, as shown in FIG. 5B. The actuator 46 is then operated to lower the main rail 44 and the fins 40' so as to deposit the first plurality of packages 21a on the fingers 26 of the accumulator 15. It can be seen that the lateral movement of the fins 40' is relatively large such that the first plurality of packages 21a is located at an innermost position on the accumulator fingers 24. Thereafter, the actuator 46 is operated to return the fins 40' laterally to the initial position illustrated in FIG. 5A.

Figure 5C:
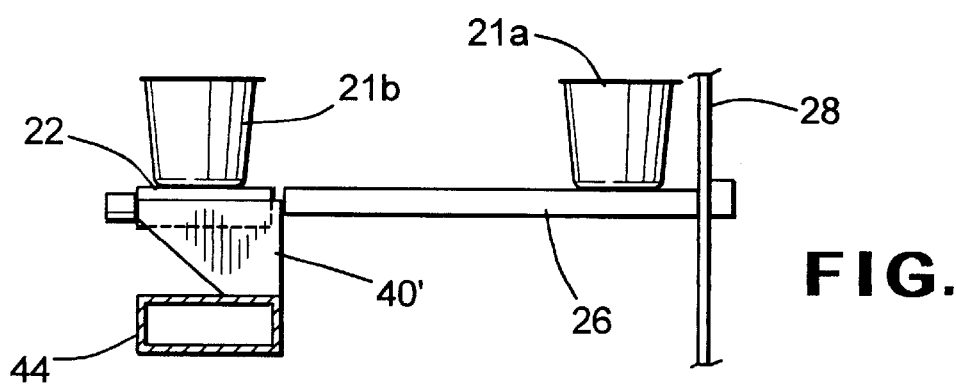
Figure 5D:
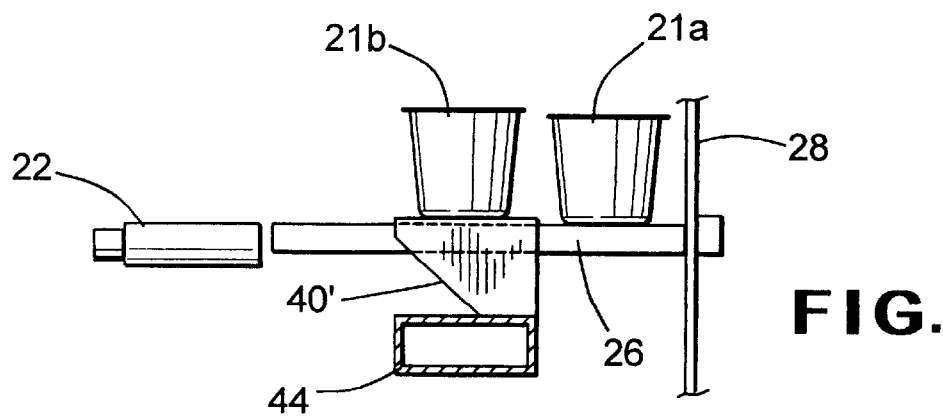

Once the fins 40' have deposited the first plurality of packages 21a on the fingers 26, the conveyor system 12 can be operated to transport a second plurality of packages 21b into the accumulator 15, as shown in FIG. 5C. The actuator 46 is again operated to elevate the fins 40' to lift the second plurality of packages 21b off of the rollers 22, as described above. It can be seen, however, that the fins 40' do not lift the first plurality of packages 21a off of the fingers 26 as described above. The actuator 46 is then operated to move the fins 40' laterally as shown in FIG. 5D, then downwardly so as to deposit the second pluralities of packages 21b on the fingers 26 of the accumulator 15. Thus, the first plurality of packages 21a remains at the innermost position on the fingers 26, while the second plurality of packages 21b is deposited at the intermediate position on the fingers 26. The fins 40' are then lowered and returned to their initial position, as described above.

Figure 5E:
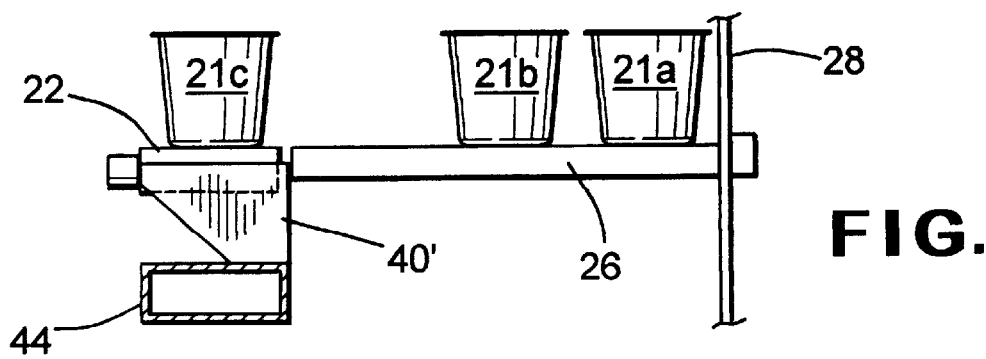
Figure 5F:
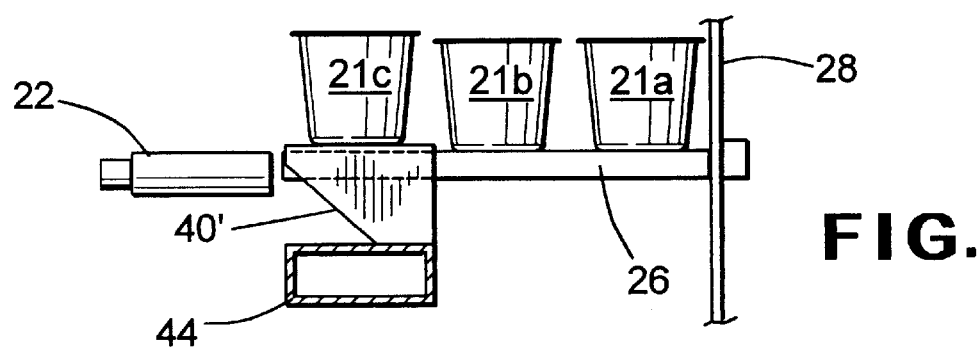
Figure 5G:
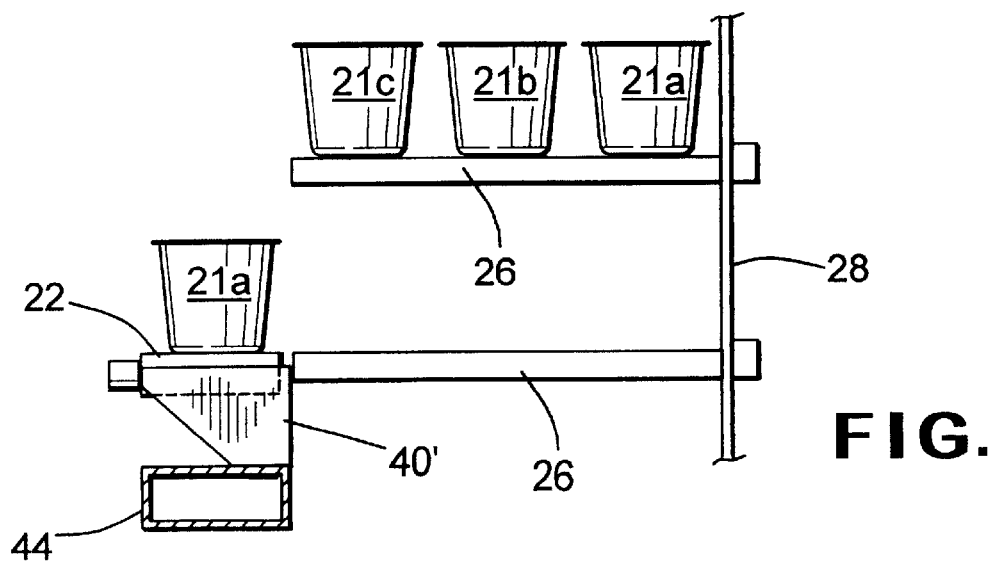

This same procedure can be repeated to deposit a third plurality of packages 21c on the fingers 26. Once the fins 40' have deposited the second pluralities of packages 21a and 21b on the fingers 26 as described above, the conveyor system 12 can be operated to transport a third plurality of packages 21c into the accumulator 15, as shown in FIG. 5E. The actuator 46 is again operated to elevate the fins 40' to lift the third plurality of packages 21c off of the rollers 22, as described above. The fins 40' do not lift the first and second pluralities of packages 21a and 21b off of the fingers 26, as described above. The actuator 46 is then operated to move the fins 40' laterally as shown in FIG. 5F, then downwardly so as to deposit both the third pluralities of packages 21c on the fingers 26 of the accumulator 15. Thus, the first plurality of packages 21a remains at the innermost position on the fingers 26, the second plurality of packages 21b remains at the intermediate position on the fingers 26, and the third plurality of packages 21c is deposited at the outermost position on the fingers 26. The fins 40' are then lowered and returned to their initial position, as described above. As shown in FIG. 5G, however, once the accumulator fingers 26 have been filled with whatever number of packages 21 it is capable of storing, the accumulator shelf 24 is elevated by the lift mechanism 28 to allow the next empty shelf 24 to be moved up and aligned with the conveyor rollers 22 for storage in the same manner. The reverse process is followed to unload the packages from the accumulator shelves 24 to the conveyor system 12.

Figure 6:
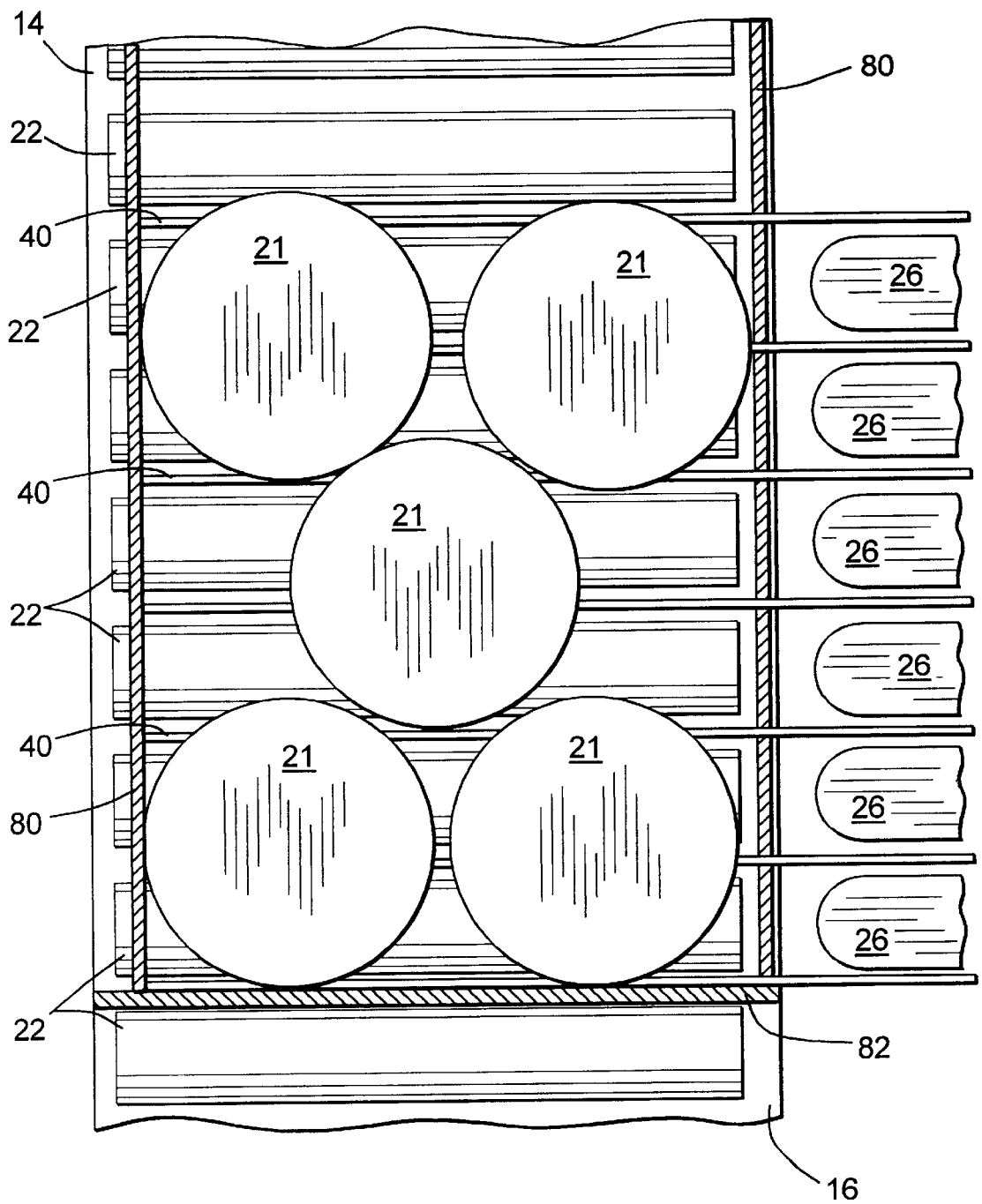
FIG. 6 is an enlarged top plan view similar to FIG. 3 illustrating the use of the transfer system of this invention with a randomly oriented plurality of packages.

An alternative mode of operation is illustrated in FIG. 6. As shown therein, the transfer system 20 of this invention can be used to transfer a random or mass accumulation of packages 21. In this mode of operation, a pair of side guide rails 80 and a stop gate 82 are used to accumulate a plurality of packages 21 on a portion of the conveyor 12. Because the transfer system 20 of this invention allows the use of relatively small center-to-center distances between the rollers 22 and the fins 40, it is possible to accumulate a mass of packages 21 which will be supported on at least two fins 40 when the transfer system 20 is operated. Some packages 21 or other types of packages may be supported in a stable manner by two points, while other packages 21 require the use of three points. For example, the packages 21 shown in FIG. 9 are intrinsically stable on two points, and therefore, can be lifted by two fins 40 without falling off. Other less stable packages 21 (i.e. those packages which are only stable on three points) may have to be larger in order to be used with the transfer system 20 of this invention. The ability to gather a large mass of packages 21 on the conveyor 12 and then transfer this large quantity to an accumulator 15 provides great flexibility in the conveying process.

The transfer system 20 of this invention can also be used when the conveyor 12 is embodied as a flat belt (not shown) or other continuous surface transportation mechanism, rather than the illustrated rollers 22. To accomplish this, a conventional "pick and place" device (not shown) can be used to pick up the packages 21 from the flat belt conveyor, move them laterally a predetermined distance, and place them down on the transfer fins 40. The upper surface of the transfer fins 40 may be vertically aligned with the conveying surface of the conveyor 12, although such is not necessary. Once the packages 21 are positioned and supported on the transfer fins 40, the system 20 may be operated in any of the modes of operation described previously. This embodiment of the transfer system 20 is well suited for those packages 21 which are not adapted to be transported on rollers. This embodiment also allows a vertical accumulator 15 to be used with the belt-type conveyors without modifications that reduce its storage capacity. More specifically, if the packages 21 were moved directly from the conveyor 12 to the accumulator 15 with a pick and place device, additional vertical space would have to be provided between the accumulator shelves to accommodate the pick and place device. Using the transfer system 20 of this invention, the vertical clearances required by the pick and place device are met by first positioning the packages 21 on the transfer fins 40 which have complete free space above their upper surfaces 40c.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly adapted to transport and store first and second packages comprising:

an accumulator including a plurality of shelves for supporting the first and second packages, each of said shelves including a support surface having a first plurality of spaces formed therein;

a conveyor including a conveying surface for transporting the first and second packages, said conveying surface having a second plurality of spaces formed therein that are generally aligned with said first plurality of spaces;

a transfer fin movable laterally through said first and second pluralities of spaces; and an actuator that can be actuated to move said transfer fin so as to (1) elevate the first package off said conveying surface of said conveyor; (2) lower the first package onto said shelf of said accumulator; (3) elevate the second package off said conveying surface of said conveyor; and (4) lower the second package onto said shelf of said accumulator laterally adjacent to the first package.

2. The assembly defined in claim 1 wherein said each of said shelves of said accumulator includes plurality of spaced-apart fingers that collectively define said support surface, said first plurality of spaces being defined between said pluralities of spaced apart fingers.

3. The assembly defined in claim 1 wherein said conveyor includes plurality of rollers that collectively define said conveying surface, said second plurality of spaces being defined between said plurality of rollers.

4. The assembly defined in claim 3 further including means for rotatably driving said plurality of rollers.

5. The assembly defined in claim 1 wherein a plurality transfer fins are movable through said first and second pluralities of spaces.

6. The assembly defined in claim 1 wherein said actuator can be actuated to move said transfer fin so as to (1) elevate the first package off said conveying surface of said conveyor; (2) lower the first package onto said shelf of said accumulator; (3) elevate the first package off said shelf and the second package off said conveying surface of said conveyor; and (4) lower both the first and second packages onto said shelf of said accumulator.

7. The assembly defined in claim 1 wherein said actuator can be actuated to move said transfer fin so as to (1) elevate the first package off said conveying surface of said conveyor; (2) lower the first package onto said shelf of said accumulator; (3) elevate the first package off said shelf and the second package off said conveying surface of said conveyor; (4) lower both the first and second packages onto said shelf of said accumulator; (5) elevate both the first and second packages off said shelf and a third package off said conveying surface of said conveyor; and (6) lower the first, second, and third packages onto said shelf of said accumulator.

8. The assembly defined in claim 1 wherein said actuator can be actuated to move said transfer fin so as to (1) elevate the first package off said conveying surface of said conveyor; (2) lower the first package onto said shelf of said accumulator; (3) elevate the second package off said conveying surface of said conveyor without elevating the first package off said conveyor surface; and (4) lower the second package onto said shelf of said accumulator laterally adjacent to said first package.

9. The assembly defined in claim 1 wherein said actuator can be actuated to move said transfer fin so as to (1) elevate the first package off said conveying surface of said conveyor; (2) lower the first package onto said shelf of said accumulator; (3) elevate the second package off said conveying surface of said conveyor without elevating the first package off said conveyor surface; (4) lower the second package onto said shelf of said accumulator laterally adjacent to said first package; (5) elevate a third package off said conveying surface of said conveyor without elevating either of the first or second packages package off said conveyor surface; and (6) lower the third package onto said shelf of said accumulator laterally adjacent to said second package.

* * * * *